July 25, 1961 F. URBAN 2,993,697
BROADHEAD ARROW
Filed June 21, 1960
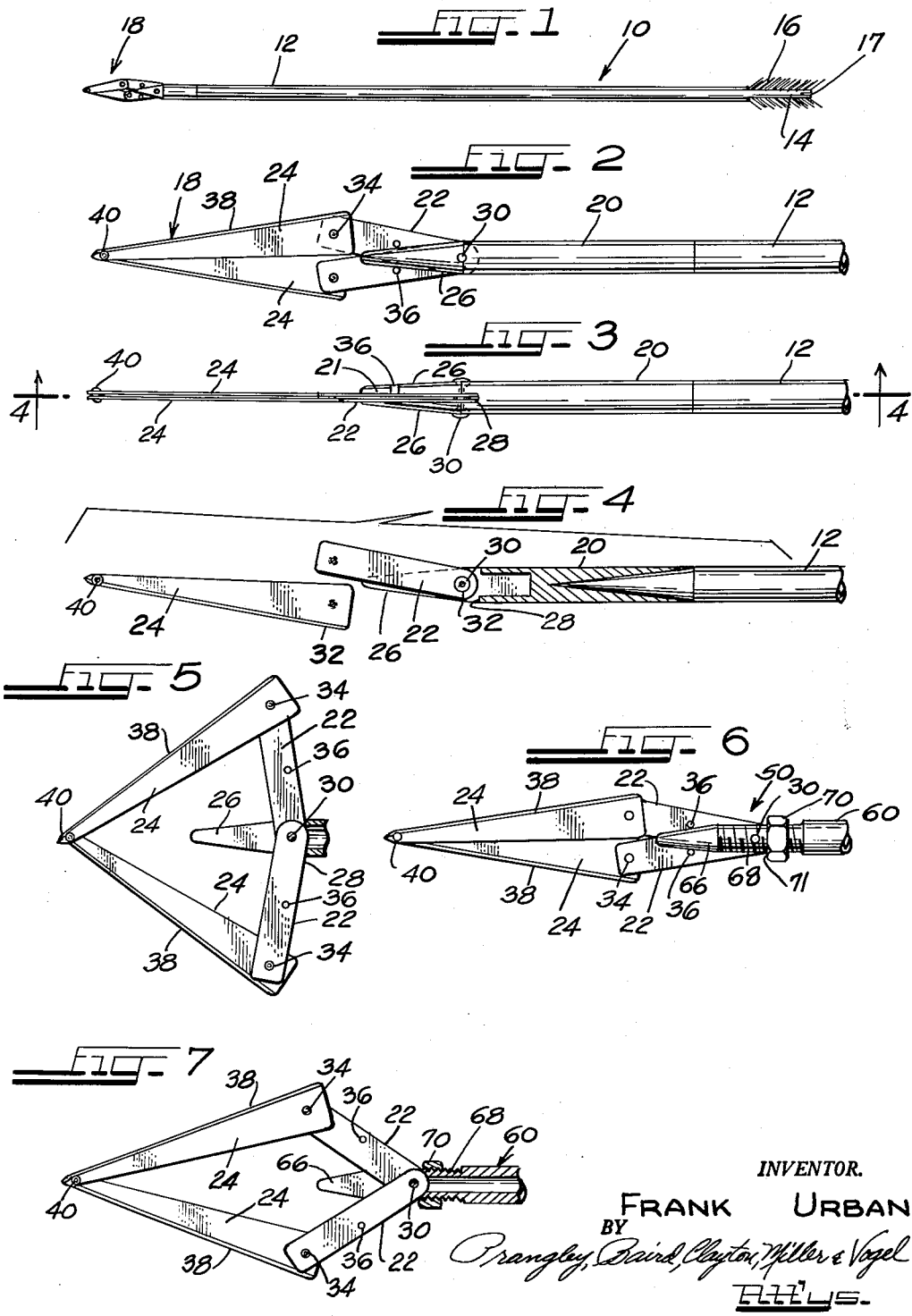
INVENTOR.
FRANK URBAN
BY
Prangley, Baird, Clayton, Miller & Vogel
ATT'YS.

United States Patent Office 2,993,697
Patented July 25, 1961

2,993,697
BROADHEAD ARROW
Frank Urban, Staunton, Ill.
Filed June 21, 1960, Ser. No. 37,638
6 Claims. (Cl. 273—106.5)

This invention relates to arrows and particularly to improved broadhead arrowheads.

Archery and the hunting of game by means of bows and arrows has become increasingly popular. Unless the archer is unusually skilled in the use of the bow and arrow, the animal, such for example as a deer, hunted and struck by an arrow may be injured but not fatally so which results in its subsequent escape. The animal after escaping may suffer considerable pain which may persist for a substantial period of time, a condition to be deplored by all sportsmen. In certain cases the animal thereafter may recover but in many cases gangrene develops in which event the meat of the animal is dangerous upon its death both to other animals that prey upon it or to a hunter that may unknowingly bring down the animal and use its meat.

Accordingly, it is desirable to provide an arrowhead which will quickly kill an animal when properly struck and one preferred form of a quick killing arrowhead is the broadhead arrowhead. The broadhead arrowhead kills primarily by inducing hemorrhaging and therefore it is desirable that the arrowhead inflict a wound which will cut the major blood vessels rather than pushing them aside and further it is desirable that the wound be substantial in cross section thereby increasing the probability of striking a blood vessel which is large enough to provide fatal hemorrhaging in a relative short time.

Attempts heretofore to provide broadhead arrowheads that inflict a large wound have not been entirely successful. The substantial cross section presented thereby results in substantial planing in the wind thereby to render the accuracy of shooting with arrows having such arrowheads substantially less than that with arrows having other types of arrowheads.

It is an important object of the present invention to provide an improved broadhead arrowhead which has a relatively small surface area at and immediately after shooting and until the time of impact with the target with the surface area disposed adjacent to the longitudinal axis of the arrow thereby to reduce planing in the wind, and upon impact with the target to provide a substantial cutting area to induce a substantial amount of hemorrhaging.

Another object of the invention is to provide an improved broadhead arrowhead of the type set forth in which the cutting edges are pivotal from a folded shooting position to an open cutting position upon impact with the target.

Still another object of the invention is to provide an improved broadhead arowhead in which the cutting edges are movable between a retracted shooting position and an extended cutting position in which means is provided releaseably to hold the blades in the shooting position until impact and in which means is provided to determine the final angularity of the cutting blades upon impact.

In connection with the foregoing object, it is another object of the invention to provide means for adjusting the angularity between the cutting blades after impact with the target.

Further features of the invention pertain to the particular arrangement of the elements of the broadhead arrowhead whereby the above outlined and additional operating features thereof are attained.

The invention, both as to its organization and method of operation, together with further objects and advantages thereof, will best be understood by reference to the following specification taken in connection with the accompanying drawing wherein like reference numerals have been used to designate like parts throughout:

FIGURE 1 is a side elevational view of an arrow having mounted thereon the broadhead arrowhead of the present invention;

FIG. 2 is an enlarged side elevational view of the broadhead arrowhead shown in FIG. 1, the parts being illustrated in the position for shooting;

FIG. 3 is a side view of the arrowhead shown in FIG. 2;

FIG. 4 is a sectional view of the arrowhead substantially as seen in the direction of the arrows along the line 4—4 of FIG. 3 and showing particularly a cross arm and a cutting blade;

FIG. 5 is a side view, partially in section, of the broadhead arrowhead, the parts being illustrated in the position assumed after impact;

FIG. 6 is a side elevational view of a second form of the arrowhead of the present invention, the parts being illustrated in the position for shooting; and FIG. 7 is a side elevational view, partially in section, of the arowhead of FIG. 6 the parts being illustrated in the position assumed after impact.

There is shown in FIG. 1 of the drawing an arrow generally designated by the numeral 10 which includes a shaft 12, a butt 14, and an arrowhead 18 which embodies the principles and features of the present invention. The shaft 12 is a longitudinal extending, cylindrical member, usually made of wood, which serves to support and maintain in a spaced apart relationship the arrowhead 18 and the butt 14 upon which is mounted an array of feathers 16. A nock 17 is provided in the butt end 14 of the arrow 10 to receive an associated bow string of a bow not shown.

The arrowhead 18 as seen in FIG. 2 includes a substantially cylindrical ferrule 20, a pair of generally rectangular thin metal cross arms 22, and a pair of tapered, thin metal cutting blades 24. The ferrule 20 has an opening in one end thereof to receive the shaft 12 as is shown in FIG. 4. The other end of the ferrule 20 contains a longitudinal slot 21 that is defined by two substantially parallel and spaced apart fingers 26. At the bottom of the slot 21 is an abutment surface 28 that is adapted to receive and support the outer edges of the cross arms 22 in their post-impact positions as will be described more fully hereinafter. The inner end of each cross arm 22 is disposed in the slot 28 between the two fingers 26. A pivot pin 30 is disposed in the ferrule 20 at a point intermediate the abutment surface 28 and the outer end of the fingers 26 and pivotally connects the inner end of each cross arm 22 to the ferrule 20. A thin, circular washer 32 is disposed between the adjacent surfaces of the cross arms 22 to maintain the adjacent surface of the inner ends of the cross arms 22 in a spaced apart relationship with respect to each other and to eliminate any frictional contact therebetween. As indicated in FIGS. 2 and 3, a stop pin 36 is mounted in each cross arm 22 at a point intermediate the inner and outer ends thereof. The stop pin 36 projects beyond the surface of the cross arm 22 and is adapted to contact the ferrule 20 upon the side of the finger 26 adjacent to the slot 28 when the arrowhead is in the folded or shooting position so as to limit the movement of the cross arms 22 inwardly with respect to the fingers 26. The shoulder 28 at the bottom of the slot 21 restrains the outward movement of the outer edges of the cross arms 22 in the open or post-impact position of the broadhead arrowhead 18 as shown in FIG. 5.

The surfaces of the cross arms 22 are preferably bowed or bent slightly so that they will engage the inner parallel and spaced apart surfaces of the slot 21 so as to maintain the cross arms 22 in frictional engagement therewith and thereby to hold the broadhead arrowhead in the folded position during shooting and flight until the arrow 10 hits a target.

The cutting blades 24, as seen in FIG. 4, are generally tapered in form and have a narrow cross section, the blades 24 being made of a metal adapted to receive and hold a keen cutting edge 38 on the outwardly disposed longitudinal edge thereof. The two cutting blades 24 are pivotally interconnected at their narrowest point by a countersunk rivet 40. Each of the cutting blades 24 at its widest end is pivotally connected to the outer end of one of the cross arms 22 by a countersunk hinging rivet 34.

Referring now to FIG. 2 the broadhead arrowhead 18 is shown in the folded position thereof adapted for shooting by the archer. In the folded or shooting position, the cross arms 22 are disposed partially in overlapping relationship with respect to one another within the slot 28 of the ferrule 20; the stop pins 36 contact the ferrule 20 on the sides of the fingers adjacent to the slot 28; the hinging rivets 34 are disposed toward each other; and the cutting blades 24 are disposed partially in overlapping relationship with respect to one another and extend outwardly from the cross arms 22 and the ferrule 20 of the arrowhead 18. It is to be appreciated that the broadhead arrowhead 18 presents the smallest surface area in the shooting position during flight, as shown in FIG. 2, and the surface area is disposed adjacent to the longitudinal axis of the arrow to minimize planing in the wind.

When the arrow 10 hits the target, the force of striking the target overcomes the friction between the surfaces of the cross arms 22 and the fingers 26 of the ferrule 20 and causes the cross arms 22 which are pivotally connected to the cutting blades 24 to move outwardly from the folded to the open or post-impact position. Referring now to FIG. 5, the broadhead arrowhead 18 is shown in the open or post-impact position thereof and is adapted in this position to cut a broad wound in an animal struck thereby. In the open position, the cross arms 22 are disposed so that a portion of the outer edges thereof located adjacent to the pivot pin 30 contacts the abutment shoulder 28 of the slot 21; the hinging rivets 34 are disposed away from each other; and the widest and inwardmost ends of the tapered cutting blades 24 are disposed away from each other so that the largest cutting area of the cutting edges 38 is presented to the flesh of the animal struck thereby. The cutting edge 38 of the arrowhead 18 is adapted to inflict a wound in an animal that severs a large vein or artery and in a manner such that the resulting hemorrhage is not coagulated by the animal's hair or the shaft 10 because of the length of the wound.

A second form 50 of the broadhead arrowhead is shown in FIGS. 6 and 7, and it has the following elements previously described: the cross arms 22, the cutting blades 24, the pivot pin 30, the hinging rivets 34, the stop pins 36, the cutting edges 38 and the pivot pin 40. The arrowhead 50 also includes a ferrule 60 having the outer end thereof threaded externally to provide threads 68 extending partially over a pair of fingers 66, similar to the fingers 26 described above and having a slot therebetween similar to the slot 21 described above. A nut 70 is mounted on the ferrule 60 and engages the threads 68 to receive and to support the outer edges of the cross arms 22 against an abutment surface 71 thereon when the arrowhead 50 is in the open or post-impact position as shown in FIG. 7.

The disposition of the cutting edges 38 of the cutting blades 24 relative to the cross arms 24 when the arrowhead 50 is in the open position is determined by the location of the abutment surface 71 of the nut 70 relative to the pivot pin 30. When the nut 70 is rotated on the threads 68 of the ferrule 60 in the direction that causes the abutment surface 71 to advance toward the pivot pin 30 and the outer end of the fingers 66, the outward movement of the cross arm 22 in the open position is less than when the nut 70 is rotated in the opposite direction. Similarly, the angularity between the shapened edges 38 of the cutting blades 24 when the arrowhead 50 is in the open position is reduced when the abutment surface 71 overlying the slot is advanced toward the outer end of the fingers 66 on the ferrule 60. The angularity between the sharpened edges 38 in the post-impact position of the arrowhead 50 is increased when the abutment surface 71 is moved away from the outer end of the fingers 66.

The decreased angularity between the sharpened edges 38 of the cutting blades 24 when the arrowhead 50 is in the open position causes a narrower wound to be inflicted in the target animal when struck by the arrowhead 50. This is desirable when the target animal is small game such as woodchucks, skunks, porcupines and the like or when it is desired to use the arrow equipped with the broadhead arrowhead 50 for stationary target practice without cutting unduly large holes in the target.

In view of the foregoing, it is apparent that there has been provided an improved broadhead arrowhead which has a relatively small surface area in the shooting position and during flight with the surface area disposed adjacent to the longitudinal axis of the arrow whereby planing in the wind is reduced; and upon impact with the target a substantial cutting area is presented to the target animal so as to induce a substantial amount of hemorrhaging from the resulting wound.

While there has been described what is at present considered to be certain preferred embodiments of the invention, it will be understood that various modifications may be made therein, and it is intended to cover in the appended claims all such modifications as fall within the true spirit and scope of the invention.

I claim:

1. An arrowhead comprising a body adapted to be mounted on the forward end of an arrow shaft and having a longitudinal slot in the outer end thereof providing two substantially parallel and spaced apart fingers, first and second cross arms disposed in said slot and having one of the ends thereof pivotally connected to said body, a first cutting blade having one end thereof pivotally connected to the other end of said first cross arm and extending outwardly therefrom, a second cutting blade having one end thereof pivotally connected to the other end of said second cross arm and extending outwardly therefrom, the other ends of said cutting blades being pivotally interconnected and the outwardly disposed longitudinal edges of said cutting blades being sharpened, said cross arms and said cutting blades being movable to a first shooting position wherein the connections between said cross arms and said cutting blades are disposed adjacent to each other, thereby to present the smallest surface area and to dispose the surface area adjacent to the longitudinal axis of the arrow during shooting to minimize planing in the wind, said cross arms and said cutting blades being movable to a second impact position wherein the connections between said cross arms and said cutting blades are disposed away from each other, thereby to present the largest cutting area by the sharpened edges of said cutting blades after impact to promote hemorrhaging, means releasably holding said cross arms and said cutting blades in said first position during shooting, the impact of said cutting blades with the target moving said cross arms and said cutting blades from said first position to said second position, and abutment means determining the position of said cross arms and said cutting blades in said second position.

2. An arrowhead comprising a body adapted to be mounted on the forward end of an arrow shaft and having a longitudinal slot in the outer end thereof providing two substantially parallel and spaced apart fingers, first and second cross arms disposed in said slot and having one of the ends thereof pivotally connected to said body, a first cutting blade having one end thereof pivotally connected to the other end of said first cross arm and extending outwardly therefrom, a second cutting blade having one end thereof pivotally connected to the other end of said second cross arm and extending outwardly therefrom, the other ends of said cutting blades being pivotally interconnected and the outwardly disposed longitudinal edges of said cutting blades being sharpened, said cross arms and said cutting blades being movable to a first shooting position wherein the connections between said cross arms and said cutting blades are disposed adjacent to each other, thereby to present the smallest surface area and to dispose the surface area adjacent to the longitudinal axis of the arrow during shooting to minimize planing in the wind, said cross arms and said cutting blades being movable to a second impact position wherein the connections between said cross arms and said cutting blades are disposed away from each other, thereby to present the largest cutting area by the sharpened edges of said cutting blades after impact to promote hemorrhaging, stop pins mounted on said cross arms and adapted to engage said fingers to determine the position of said cross arms and said cutting blades in said first position, means releasably holding said cross arms and said cutting blades in said first position during shooting, the impact of said cutting blades with the target moving said cross arms and said cutting blades from said first position to said second position, and abutment means determining the position of said cross arms and said cutting blades in said second position.

3. An arrowhead comprising a body adapted to be mounted on the forward end of an arrow shaft and having a longitudinal slot in the outer end thereof providing two substantially parallel and spaced apart fingers, first and second cross arms disposed in said slot and having one of the ends thereof pivotally connected to said body, a first cutting blade having one end thereof pivotally connected to the other end of said first cross arm and extending outwardly therefrom, a second cutting blade having one end thereof pivotally connected to the other end of said second cross arm and extending outwardly therefrom, the other ends of said cutting blades being pivotally interconnected and the outwardly disposed longitudinal edges of said cutting blades being sharpened, said cross arms and said cutting blades being movable to a first shooting position wherein the connections between said cross arms and said cutting blades are disposed adjacent to each other, thereby to present the smallest surface area and to dispose the surface area adjacent to the longitudinal axis of the arrow during shooting to minimize planing in the wind, said cross arms and said cutting blades being movable to a second impact position wherein the connections between said cross arms and said cutting blades are disposed away from each other, thereby to present the largest cutting area by the sharpened edges of said cutting blades after impact to promote hemorrhaging, means releasably holding said cross arms and said cutting blades in said first position during shooting, the impact of said cutting blades with the target moving said cross arms and said cutting blades from said first position to said second position, and a shoulder formed on said body between said fingers and adapted to engage said cross arms to determine the position of said cross arms and said cutting blades in said second position.

4. An arrowhead comprising a body adapted to be mounted on the forward end of an arrow shaft and having a longitudinal slot in the outer end thereof providing two substantially parallel and spaced apart fingers, first and second cross arms disposed in said slot and having one of the ends thereof pivotally connected to said body, a first cutting blade having one end thereof pivotally connected to the other end of said first cross arm and extending outwardly therefrom, a second cutting blade having one end thereof pivotally connected to the other end of said second cross arm and extending outwardly therefrom, the other ends of said cutting blades being pivotally interconnected and the outwardly disposed longitudinal edges of said cutting blades being sharpened, said cross arms and said cutting blades being movable to a first shooting position wherein the connections between said cross arms and said cutting blades are disposed adjacent to each other, thereby to present the smallest surface area and to dispose the surface area adjacent to the longitudinal axis of the arrow during shooting to minimize planing in the wind, said cross arms and said cutting blades being movable to a second impact position wherein the connections between said cross arms and said cutting blades are disposed away from each other, thereby to present the largest cutting area by the sharpened edges of said cutting blades after impact to promote hemorrhaging, means releasably holding said cross arms and said cutting blades in said first position during shooting, the impact of said cutting blades with the target moving said cross arms and said cutting blades from said first position to said second position, said abutment means being adjustable along said body to adjust the angularity between the sharpened edges of said cutting blades in said second position.

5. An arrowhead comprising a body adapted to be mounted on the forward end of an arrow shaft and having a longitudinal slot in the outer end thereof providing two substantially parallel and spaced apart fingers, first and second cross arms disposed in said slot and having one of the ends thereof pivotally connected to said body, a first cutting blade having one end thereof pivotally connected to the other end of said first cross arm and extending outwardly therefrom, a second cutting blade having one end thereof pivotally connected to the other end of said second cross arm and extending outwardly therefrom, the other ends of said cutting blades being pivotally interconnected and the outwardly disposed longitudinal edges of said cutting blades being sharpened, said cross arms and said cutting blades being movable to a first shooting position wherein the connections between said cross arms and said cutting blades are disposed adjacent to each other, thereby to present the smallest surface area and to dispose the surface area adjacent to the longitudinal axis of the arrow during shooting to minimize planing in the wind, said cross arms and said cutting blades being movable to a second impact position wherein the connections between said cross arms and said cutting blades are disposed away from each other, thereby to present the largest cutting area by the sharpened edges of said cutting blades after impact to promote hemorrhaging, means releasably holding said cross arms and said cutting blades in said first position during shooting, the impact of said cutting blades with the target moving said cross arms and said cutting blades from said first position to said second position, said body having threads thereon and extending over a portion of said fingers, and a ring engaging said threads and having the forward edge thereof overlying said slot and adapted to engage said cross arms to determine the position thereof and of said cutting blades in said second position, the position of said ring being adjustable along said body to adjust the angularity between the sharpened edges of said cutting blades in said second position.

6. An arrowhead comprising a ferrule adapted to be mounted on the forward end of the shaft and having a longitudinal slot in the end thereof providing two substantially parallel and spaced apart fingers, first and second cross arms disposed in said slot and having one of the ends thereof pivotally connected to said ferrule on a common axis, a first tapered cutting blade having the larger end thereof pivotally connected to the other end of said first cross arm and extending outwardly therefrom, a second tapered cutting blade having the larger end thereof pivotally connected to the other end of said cross arm and extending outwardly therefrom, the other smaller ends of said cutting blades being interconnected and the outwardly disposed longitudinal edges being sharpened, said cross arms and said cutting blades being movable to a first shooting position wherein the connections between said cross arms and said cutting blades are disposed adjacent to each other, thereby to present the smallest surface area and to dispose the surface area adjacent to the longitudinal axis of the arrow during the shooting to minimize planing in the wind, said cross arms and said cutting blades being movable to a second impact position wherein the connections between said cross arms and said cutting blades are disposed away from each other and said sharpened edges are disposed in a predetermined angularity to each other whereby to present the largest cutting area by the sharpened edges of said cutting blades during impact to promote hemorrhaging, said cross arms frictionally engaging said fingers releasably to hold said cross arms and said cutting blades in said first position during shooting, the impact of the outer ends of said cutting blades with the target moving said cross arms and said cutting blades from said first position to said second position, and abutment means on said ferrule overlying said slot and adapted to engage said cross arms to determine the position end of said cutting blades and the angularity between said sharpened edges in said second position.

References Cited in the file of this patent

UNITED STATES PATENTS

| | | |
|---|---|---|
| 2,568,417 | Steinbacher | Sept. 18, 1951 |
| 2,806,317 | Minisini | Sept. 17, 1957 |
| 2,820,634 | Vance | Jan. 21, 1958 |
| 2,859,970 | Doonan | Nov. 11, 1958 |
| 2,939,708 | Scheib | June 7, 1960 |